Figure 1:
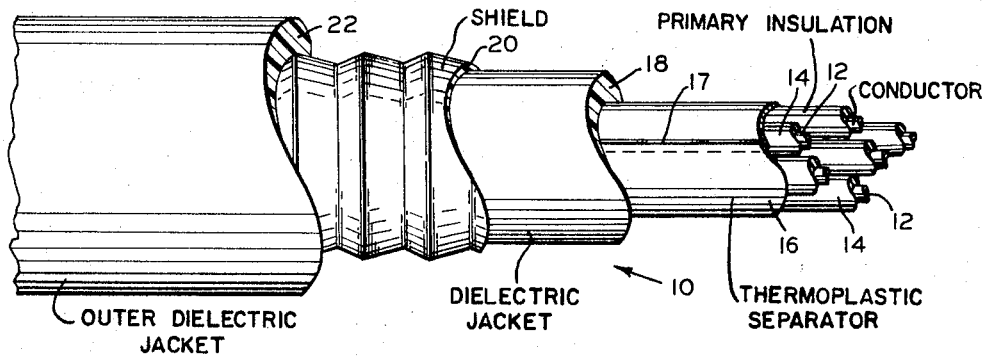

Feb. 14, 1967 C. A. ALM 3,304,214
METHOD FOR MAKING ELECTRICAL CABLE
Filed June 7, 1963 2 Sheets-Sheet 1

INVENTOR.
CHRISTIAN A. ALM
BY
BLAIR AND BUCKLES
ATTORNEYS.

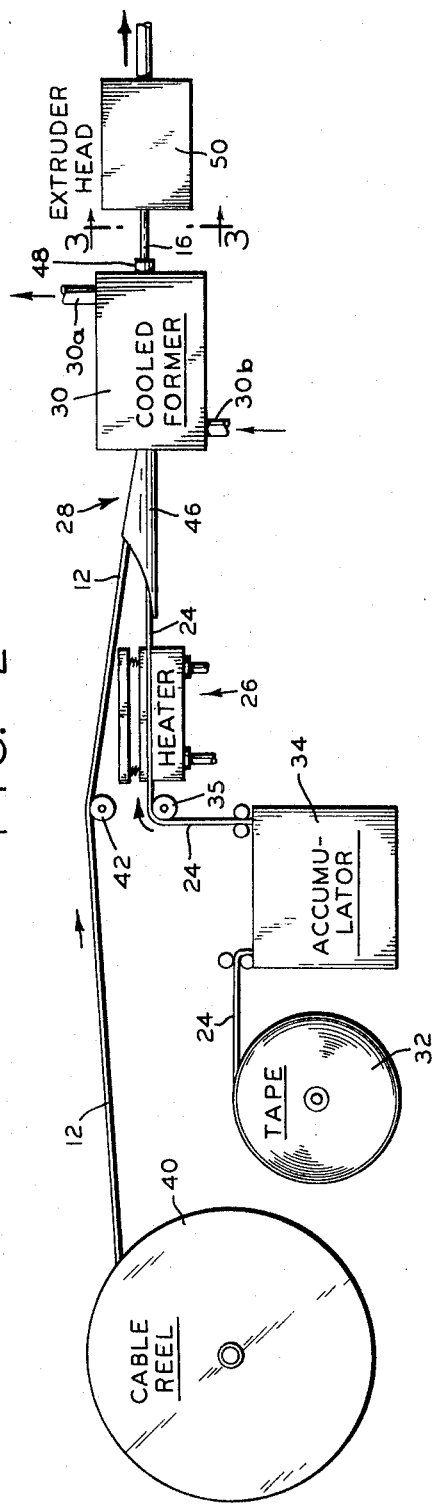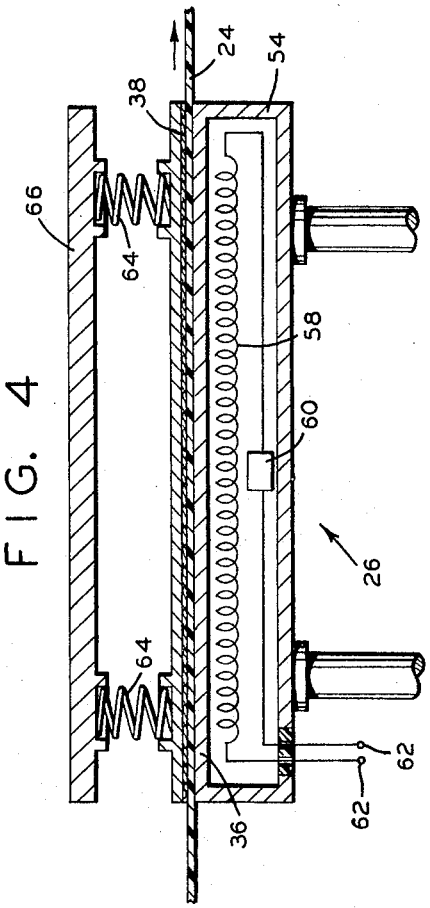

United States Patent Office 3,304,214
Patented Feb. 14, 1967

3,304,214
METHOD FOR MAKING ELECTRICAL CABLE
Christian A. Alm, Cheshire, Conn., assignor to The Whitney Blake Company, New Haven, Conn.
Filed June 7, 1963, Ser. No. 286,221
6 Claims. (Cl. 156—54)

This invention relates to an improved multi-conductor cable and a method and apparatus for fabricating it. More specifically, it relates to a multi-conductor cable in which a tubular separator enclosing the individually insulated conductors of the cable has an overlapping longitudinal seam. To form the separator, a tape of heated thermoplastic material is positioned along the cable and shaped into a tube around the conductors. The tape is then cooled and thereafter retains its formed tubular shape. This application is a continuation-in-part of my earlier filed application, Serial Number 80,288 filed January 3, 1961 and now abandoned.

In certain types of cable, the insulated conductors are first covered by a separator of synthetic plastic material, preferably a terephthalate polyester, followed in turn by an inner polyethylene jacket and may be further covered by a copper sheath and an outer polyethylene jacket.

After cabling of the insulated conductors one or more jackets are applied by extrusion to protect and insulate the cable. During extrusion the jacketing material is at a high temperature, and is hot enough to melt or plasticize the primary insulation on the conductors. Thus, unless the hot jacketing material is kept out of contact with the primary insulation on the conductors, the conductor insulation will become plastic, causing shorts, bonding of the insulation to the jacket, or other unsatisfactory characteristics in the completed cable. To obviate this problem a separator is required around the insulated conductors during cable manufacture in order to prevent change of the primary insulation during extrusion of the jacket nearest the insulated conductors.

One method presently used to apply the separator is to apply a tape by means of a spiral wrapping machine in much the same manner that electrical tape is applied by hand over conductors, splices, etc. To ensure closure of the separator, the turns are overlapped, resulting in a cable core that is somewhat rougher than desirable.

Another disadvantage in the use of spiral wrapping arises in small cable. In the manufacture of multi-conductor cable, the spiral wrapping operation is performed at the same stage where the cabling operation is performed, i.e., where the pairs of conductors are twisted together to form the cable. However, such cabling is not necessary in small cables, and, therefore, the use of a spiral wrapping machine results in an extra position on the line that would otherwise not be needed. Where cabling is required, the spiral wrapping equipment often limits the production speed of the entire cabling unit.

Another method of applying the polyester separator is to apply the tape longitudinally at the stage where the inner polyethylene jacket is applied. The cable and tape pass through a forming tube. The width of the flat tape is greater than the forming tube circumference. Thus, the tape is folded around the conductors with an overlap by the tube and takes on its circular cross section. However, the tape has considerable springiness and tends, of itself, to open up before the polyethylene jacket can be formed over it. This results in a non-circular cross section, as well as projection of the edges of the tape into the polyethylene jacket, which reduces thickness and uniformity of the latter.

To avoid these disadvantages, the form of the tape is maintained by a binding of string applied as soon as the cable emerges from the forming tube. This results in an additional capital investment in binding machines, together with the cost of operating them. There is also an increased cost of materials. Furthermore, if the binding breaks or runs out, a large section of cable may be ruined, since it is ordinarily sold in continuous lengths of many hundreds or even thousands of feet. As a matter of fact, to avoid the run-out problem, two machines for applying the binding are often used, so that one can be turned on when the binding in the other is about to run out. Any variations in binder tension will result in cable diameter variations. The binder also indents the inner surface of the hot polyethylene extruded thereon and reduces the jacket wall thickness.

Accordingly, a principal object of my invention is to provide an improved multi-conductor cable having a thin separator of thermoplastic material such as terephthalate polyester immediately around the individually insulated conductors of the cable core.

Another object of my invention is to provide a multi-conductor cable of the above description that requires less material to fabricate and accordingly is less bulky than prior cable of this type.

A further object of my invention is to provide a multi-conductor cable of the above type that is easier to manufacture than cable of this type.

Yet another object of my invention is to provide an improved method and apparatus for applying the separator of thermoplastic material in a cable of the above type.

A still further object of my invention is to provide a method and apparatus for fabricating multi-conductor cable of the above description that is more efficient and more reliable than presently available.

Other objects of the invention will in part be obvious and will in part appear hereinafter.

The invention accordingly comprises the several steps and the relation of one or more of such steps with respect to each of the others, the apparatus embodying the features of construction, combination and arrangement of parts which are adapted to effect such steps and the article which possesses the characteristics, properties and relation of elements, all as exemplified in the detailed disclosure hereinafter set forth, and the scope of the invention will be indicated in the claims.

Figure 3:
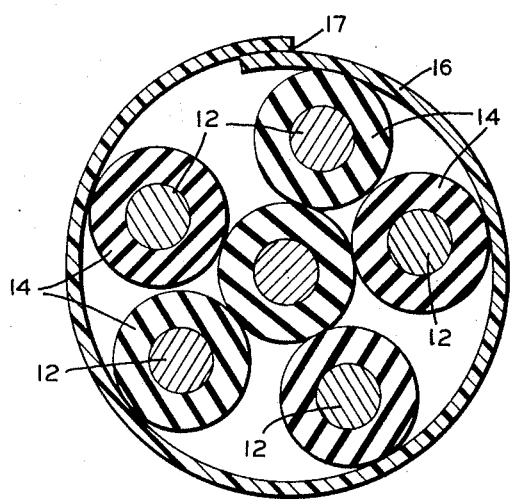

For a fuller understanding of the nature and objects of the invention, reference should be had to the following detailed description taken in connection with the accompanying drawings, in which:

FIGURE 1 is a side view, partly cut away, of a section of multi-conductor cable embodying the features of my invention, FIGURE 2 is a schematic side view of apparatus for making multi-conductor cable according to my invention, FIGURE 3 is a transverse section taken along line 3—3 of FIGURE 2 showing the cable after the thermoplastic separator is applied, FIGURE 4 is an enlarged schematic side view showing the heater of FIGURE 2.

In general, the practice of my invention involves heating a thin flat tape of a synthetic thermoplastic resin to a softened, plastic condition and then drawing it through a forming tube along with the individually insulated conductors of the cable. As explained above, the tube forms the tape into a cylindrical separator enclosing the conductors. The tape is then cooled to the elastic state and, thereafter, the natural unrestrained shape of the thermoplastic separator is the desired tubular one. Thus, the separator does not require the additional binding mentioned above. Furthermore, it is applied with compact apparatus at the stage where the first polyethylene jacket is formed on the cable, and thus does not require an additional position in the production line.

Tapes of terephthalate polyester are preferred and are relatively stiff and elastic up to about 200° F. The melting point of such tapes is approximately 485° F. but will soften at temperatures over 200° F.

FIGURE 1 shows a multi-conductor cable, generally indicated at 10, embodying features of my invention. The cable 10 comprises a cable core of individual conductors 12, each covered with primary insulation 14 which is preferably of polyethylene. The insulated conductors are enclosed in a thermoplastic separator 16, preferably made of a terephthalate polyester and having an overlapping longitudinal seam 17. In addition, a dielectric jacket 18, preferably of polyethylene, a copper shield 20 and an outer dielectric jacket 22, also made of polyethylene, are disposed around separator 16.

The apparatus used in fabricating the cable is illustrated in FIGURE 2. As shown therein, a tape 24, preferably of a terephthalate polyester such as glycol terephthalate and having a naturally flat cross section is softened by being drawn through a heater generally indicated at 26 and is then pssed through a forming tube generally indicated at 28 along with the insulated conductors 12. The tape 24, which extends substantially parallel to the conductors 12, is formed around the conductors in the tube 28 to form the tubular separator 16 enclosing them and having an overlapping seam. Prior to emerging from the forming tube 28, the separator 16 is cooled to the elastic state by a heat exchanger 30 and it then has a natural, unstressed cross section that is substantially circular, i.e., it will retain its circular shape in the absence of an elastic deformation. Next, the dielectric jacket 18 is formed on the cable in the extruder 50.

More specifically, still referring to FIGURE 2, the tape 24 is fed to the heater 26 from a tape feed reel 32 through an accumulator 34. The accumulator stores an amount of tape of sufficient length to permit the splicing of the beginning of another tape to the end of the tape being used. From the accumulator the tape passes over guide roller 35 and then through the tape heater 26.

The individually insulated conductors 12 are delivered to the tube 28 from a cable reel indicated at 40, the conductors passing over guide roller 42 and then into forming tube 28.

The forming tube 28 is an elongated cylinder having a flared input end 46, with a heat exchanger 30 disposed toward an output end 48. The heat exchanger 30 has an input pipe 30a and an output pipe 30b through which a coolant flows to cool the portion of the tube 28 within the exchanger. The tube 28 is preferably of a high heat conductivity material such as copper which readily transfers heat from the tape 24 to the surrounding coolant.

The jacketing extruder, indicated at 50 in FIGURE 2, applies the dielectric jacket 18. Copper shield 20 and outer jacket 22 are applied in subsequent operations. It should be understood that a capstan take-up apparatus, though not shown, pulls the cable through the cable forming operations, as is well known in the art.

In the operation of the apparatus of FIGURE 2, the tape 24 is drawn through the heater 26 and uniformly heated to a softened condition, about 300° to 350° F. for tape of a terephthalate polyester with the cable being formed at the rate of 140 to 150 feet per minute. The heated tape 24 and the insulated conductors 12 are continuously drawn into the input end 46 of the forming tube 28 at the same rate, preferably with the conductors disposed above the tape. The tube folds the sides of the tape 24 upward and over to form it into the tubular jacket 16 enclosing the conductors 12. The overlapped seam 17 of the tube thus formed extends longitudinally with the cable in a substantially straight line. Since the tape is shaped while in a softened, plastic condition, it assumes the configuration of the tube end portion 48, i.e., a circular cross section, without any residual stresses. It is returned to the elastic condition by the cooling effect of the heat exchanger 30 while still in the tubular form, and thus retains this tubular shape.

A cross section of the partially fabricated cable, after emerging from the forming tube 28, is shown in FIGURE 3. The separator 16 encloses the conductors 12 and has an overlapping seam 17. The circular cross section imparted by the tube 28, provides a smooth, even core whose inner diameter is substantially equal to the outer diameter of the bundled conductors 12. The dielectric jacket 18 (FIGURE 1) is formed directly over the separator 16 in the apparatus 50 (FIGURE 2). The molten polyethylene for the jacket 18 does not bond to the insulation of the conductors, since the latter is now protected by the separator 16, which is made of material that withstands the temperature of the molten material used in the extrusion of jacket 18.

Referring now to FIGURE 4, the heater 26 comprises a housing 54 including heated plate 36 and enclosing a heating coil 58. The coil 58 is connected in series with a thermostat 60 between a pair of electric terminals 62. The coil is arranged to uniformly heat the plate 36, and the thermostat 60 is set to maintain the temperature of the plate at the desired level. Pressure pad 38 is preferably made of an insulating fabric, and is provided with a heat-reflecting lower surface to heat the tape more evenly. It is resiliently urged against the plate 36 by springs 64, which are compressed by pressure plate 66 which may be adjustable.

Thus the tape is heated to the desired temperature for forming, the temperature of plate 36 being set to provide the proper tape temperature for the particular rate that the tape is passed through the heater. A heater temperature of from 300° to 350° F. will soften the tape sufficiently when employing a tape speed of from 140 to 150 feet per minute. At such temperatures and tape speeds a heater plate from 16 to 18 inches long has been found suitable. The thin tape heats very rapidly to approximately the heater temperature. The length of the cooled separator forming tube 28 depends upon the temperature and volume of the incoming coolant to the heat exchanger. The cooled former may be 12 to 16 inches long, for example, with a coolant temperature of from 55° to 65° F.

With increased cable forming speeds the tape heater may be elongated and/or its operating temperature may be increased. In such a case the cooled former may also be elongated and/or the coolant temperature lowered.

The tape must be heated to at least its softening temperature wherein its elastic properties are minimized. Upon cooling in the cooled former the elastic properties of the tape are restored to maintain the tape in a non-stressed condition about the insulated cable conductors prior to entry into the jacketing extruder.

In passing through the extruder head 50 the tape is exposed to polyethylene, for example, which may be at a temperature of as much as 400° F. at the extruder head exit. The tape separator is exposed to such a temperature for a relatively short period of time, however, as the jacket 18 is cooled by water immersion as soon as possible after leaving the extruder head. Further, the heated polyethylene does not conduct heat to the tape as readily as does heater 26 and accordingly maintains its circular configuration on passing through the extruder head. It has been found that cable uniformity is greatly improved by cooling the separator tape prior to entry into the extruder. Thus the cooled tape can withstand extruder temperatures for a short exposure and be an effective protecting separator for the insulated conductors while passing through the extruder.

In summary, I have described an improved multi-conductor cable having an improved separator around the insulated conductors. The separator is thermoplastic and has a circular cross section after being formed. It is generally characterized by a longitudinal seam extending along the cable. The separator is more reliable than prior separators, in which the edges of a relatively stiff, "springy" flat tape constrained as a tube tend to open to the flat configuration. Furthermore, my improved separator costs less to form on cable than prior separators of the same type.

I have also described an improved method and apparatus for forming the separator, which may be a terephthalate polyster. A thermoplastic tape is heated and drawn with the insulated conductors through a forming tube that longitudinally wraps the heated tape around the conductors. The wrapped tape is then cooled while constrained in a circular cross section. This method eliminates costlier and unreliable operations, such as spiral wrapping the tape or binding it in place with string.

It will thus be seen that the objects set forth above, among those made apparent from the preceding description, are efficiently attained and, since certain changes may be made in carrying out the above process, in the described product and in the constructions set forth without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described my invention, what I claim as new and desire to secure by Letters Patent is:

1. The method of forming a jacketed cable having multiple conductors covered by primary insulation at the cable core, comprising the steps of
   (A) heating a thin, flat separator tape of relatively stiff, springy thermoplastic material
       (1) to at least its softening point,
   (B) wrapping the separator tape around the cable core with a longitudinal seam
       (1) while said separator tape is in a heated, softened condition,
   (C) cooling the separator tape to its stiff, springy condition and then
   (D) applying a jacketing material over the taped cable core.

2. The method defined in claim 1 wherein
   (E) the separator tape and cable are pulled together through a cooled forming tube,
       (1) before application of the jacketing material,
   (F) with the separator tape being pulled through a heater prior to entry into the forming tube,
whereby the heated, softened separator tape is wrapped about the cable core with a longitudinal seam and is cooled to its stiff, springy condition in the cooled forming tube.

3. The method defined in claim 1 wherein the separator tape is imade of a terephthalate polyester.

4. The method of forming a jacketed cable having multiple conductors covered by a primary insulation at the cable core, comprising the steps of
   (A) heating a thin, flat separator tape of relatively stiff, springy thermoplastic material
       (1) to a softened, unstressed condition,
   (B) pulling the cable core and separator tape together through a forming tube,
       (1) the separator tape being pulled longitudinally through the forming tube to wrap around the cable core
       (2) with a longitudinal overlapping seam,
   (C) cooling the separator tape in the forming tube to its stiff, springy condition
       (1) with the separator tape wrapped around the cable core, and then
   (D) applying a jacketing material over the taped cable core.

5. The method defined in claim 4 wherein the separator tape is made of a terephthalate polyester.

6. The method defined in claim 5 wherein the separator tape is heated to a temperature of from 300 to 350° F. before being pulled into the forming tube.

References Cited by the Examiner

UNITED STATES PATENTS

| | | | |
|---|---|---|---|
| 2,065,561 | 12/1936 | Boyle et al. | 156—54 |
| 2,090,744 | 8/1937 | Boe | 156—54 |
| 2,442,307 | 5/1948 | McMahon | 174—107 |
| 2,849,526 | 8/1958 | Brockbank | 174—107 |
| 2,883,314 | 4/1959 | Martin | 156—55 X |
| 3,020,335 | 2/1962 | Gillis | 174—112 |

OTHER REFERENCES

Bjorksten Research Laboratories, Polyesters and Their Applications, p. 222, Reinhold Publishing Corp., New York (1956).

Mylar, Du Pont advertisement, Wire and Wire Products, January 1958, p. 10.

EARL M. BERGERT, *Primary Examiner.*

JOHN P. WILDMAN, *Examiner.*

W. F. ZAGURSKI, J. MATHEWS, T. R. SAVOIE,
*Assistant Examiners.*